June 27, 1961
O. SCHOENECK
2,990,064
WASH TANK AND STONE SEPARATOR
Filed June 24, 1959
2 Sheets-Sheet 1
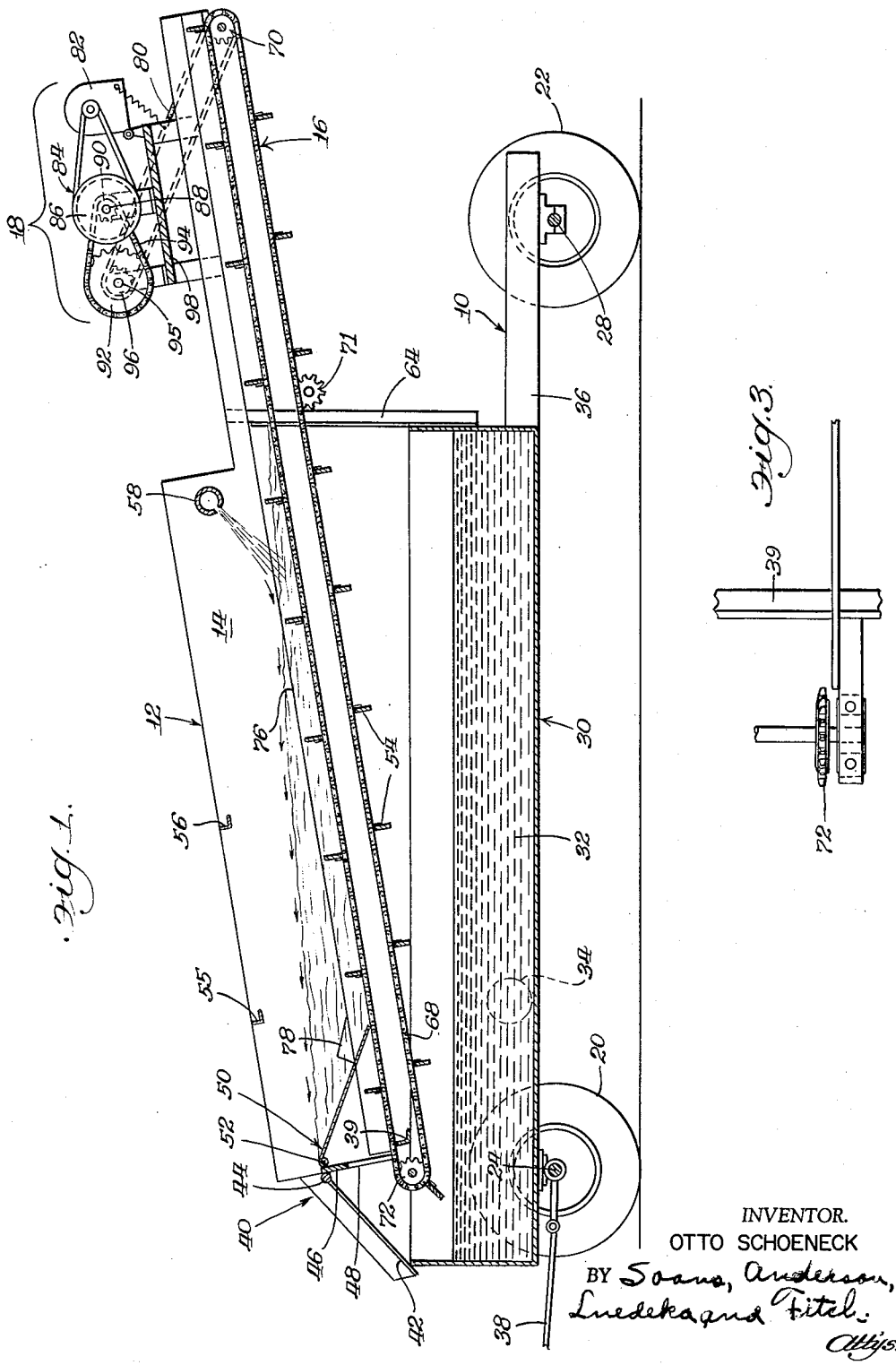
INVENTOR.
OTTO SCHOENECK
BY Soans, Anderson,
Luedeka and Fitch.
Attys.

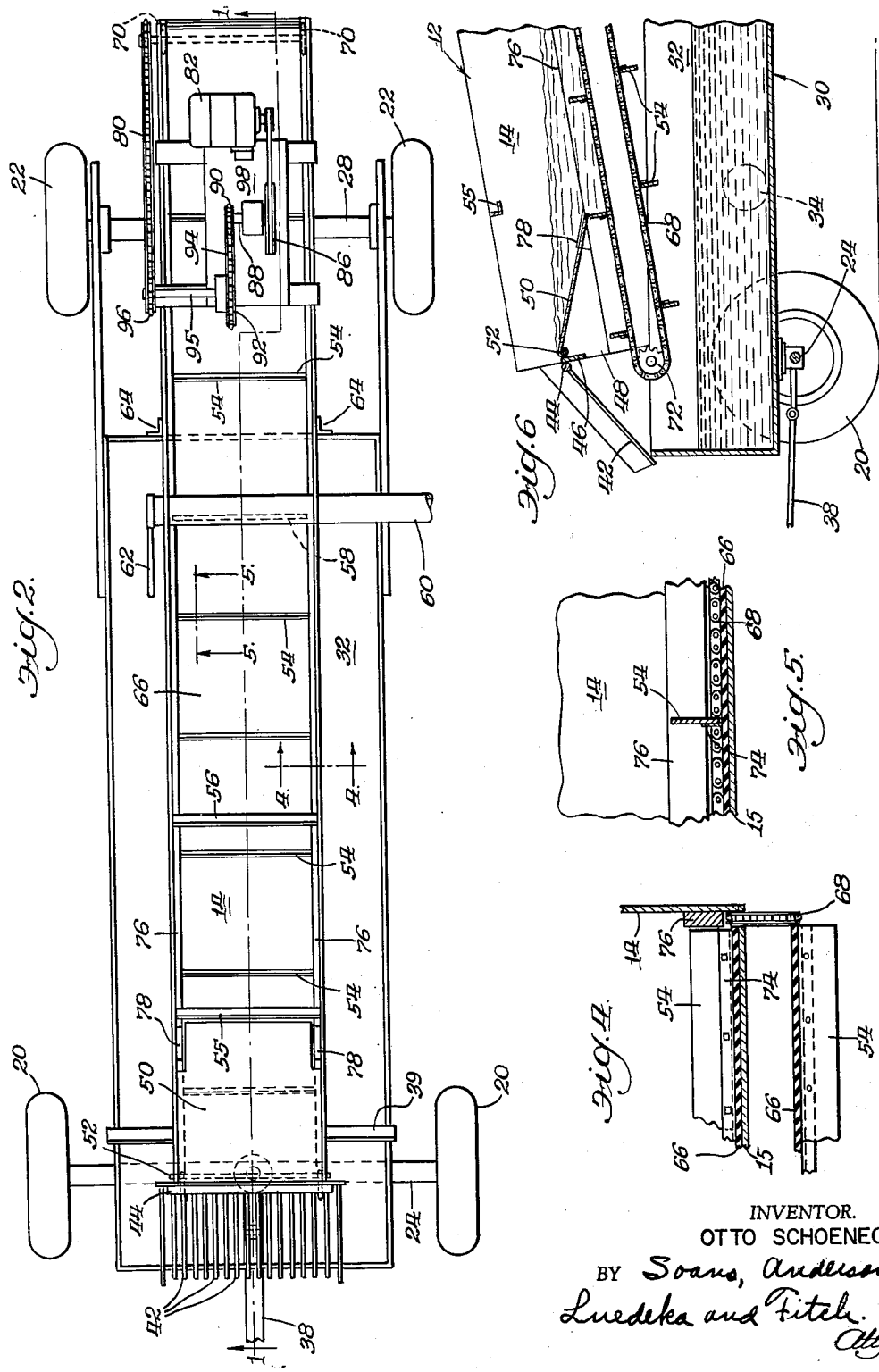

United States Patent Office 2,990,064
Patented June 27, 1961

2,990,064
WASH TANK AND STONE SEPARATOR
Otto Schoeneck, Rhinelander, Wis., assignor to Red Dot Foods, Inc., Madison, Wis., a corporation of Wisconsin
Filed June 24, 1959, Ser. No. 822,614
2 Claims. (Cl. 209—156)

The present invention relates generally to apparatus for separating potatoes from stones and other adhering materials, and more particularly, it relates to apparatus for washing harvested potatoes and removing stones and debris from the potatoes.

In the harvesting of potatoes, stones, soil and debris are inherently with the potatoes. It is necessary to remove the stones and debris from the potatoes before the potatoes are processed in the processing plants in order that the processing equipment will not be damaged. It is, of course, desirable to remove as much soil as possible from the potatoes before shipping to processing plants. Heretofore, stones and debris were generally removed by a hand picking or sorting operation. This operation is expensive and time consuming.

While the stones and debris can be separated from the potatoes at the processing plant, it is desirable to effect such operation prior to transport of the potatoes to the plant and it is preferably carried out in the field near the harvesting operation. This obviates undue shipping of the stones and debris, and further limits damage to potatoes in transport.

Thus, it is highly desirable to remove stones and debris from harvested potatoes in an economical manner so as to facilitate the handling of the potatoes and to protect the processing equipment in the plants from damage.

Accordingly, it is a main object of this invention to provide improved apparatus for separating potatoes from associated material, such as soil, stones and debris.

It is a more particular object of the invention to provide means for collecting potatoes free from associated material and to aggregate the separated material in the field.

A still further object of this invention is to provide improved apparatus for not only removing associated materials from harvested potatoes but also to effect a wash of the potatoes.

A more particular object of this invention is to provide improved apparatus for handling of harvested potatoes in such a way that the potatoes are not damaged but, at the same time, the stones and debris are removed from the potatoes in the field.

Other objects and advantages of this invention will become apparent by reference to the following description and accompanying drawings which show a preferred embodiment of the invention.

In the drawings:

FIGURE 1 is a side view, partially in cross-section, of the improved apparatus of the invention, the view being taken substantially along line 1—1 of FIGURE 2;

FIGURE 2 is a plan view of the apparatus shown in FIGURE 1;

FIGURE 3 is an enlarged fragmentary view of a sprocket and bearing assembly associated with a conveyor in the apparatus of the invention;

FIGURE 4 is a fragmentary section taken along line 4—4 of FIGURE 2, this figure being a cross-section of the conveyor;

FIGURE 5 is also a fragmentary section taken along line 5—5 in FIGURE 2, this figure also being partially in cross-section; and FIGURE 6 is an enlarged, side elevational view of the potato delivery end of the apparatus of the invention.

In handling harvested potatoes in accordance with this invention, the potatoes with associated soil, stones and debris are dropped into a flowing stream of water and the potatoes float with the stream to a downstream position. The stones and debris drop to the bottom of the stream and moved countercurrently to an upstream position where they are discharged from the apparatus of the invention.

In order to practice this process, apparatus is provided which is shown in the accompanying drawings, previously described. The apparatus includes a carriage, designated 10 in the drawings, on which is mounted a separating means 12. The separating means, as shown in the drawings, includes a wash tank 14 provided with a suitable bottom 15 extending the length of the tank, and having a conveyor 16 which travels along the bottom of the wash tank and removes stones and debris from the separating means. Associated with the conveyor 16 is a drive means 18 which actuates the conveyor 16, as will be more fully described hereinafter.

The carriage 10 comprises a pair of front wheels 20 and a pair of rear wheels 22 which, for convenience, are rubber pneumatic tire wheels. The wheels 20 and 22 are mounted on the usual axles 24 and 28, respectively. Mounted between the axles 24 and 28 is a sump 30 which comprises a tank 32 which collects water from the separating means 12 and discharges it through a discharge pipe 34 located in one side of the tank. Water from this discharge pipe may be returned to a stream or, if there is not too much dirt or soil with the harvested potatoes, it may be recycled in the apparatus.

As shown in the drawings, the tank 32 is carried at the potato discharge end on the axle 24 and is connected at the other end to a supporting beam 36 which is welded or otherwise connected to the tank 32. This beam is carried at its rearward end on the axle 28 of the rear wheels 22.

A tongue 38 is connected to the front axle 24 for drawing the carriage 10 about a field or on the road, as desired. This permits the apparatus to be carried to the desired location and effect removal of stones and debris close to the harvesting of the potatoes so that the potatoes can be sent to the processing plant in a stone and debris-free condition.

The wash tank 14 of the separating means 12 extends angularly upwardly from the forward end of the apparatus, as is particularly shown in FIGURE 1 of the drawings. The wash tank is generally rectangular in shape, in the illustrated embodiment, and, at its forward end, is supported upon a transversely extending angle member 39 which is attached to the top of the tank 32. Extending downwardly and forwardly from the front of the wash tank 14 and over the tank 32 is a screen arrangement 40 which comprises a series of spaced rods 42 which are connected to a transversely extending bar 44. The screen rods 42 extend between the transversely extending bar 44 and the front edge of the tank 32. The screen arrangement 40 serves to permit the water to drop into the sump 30 and the potatoes to discharge from the apparatus of the invention for further handling, such as grading and sizing. In this connection, the potatoes can be picked up on a conveyor or collected in a suitable hopper as desired.

The front wall 46 of the wash tank 14 has an opening at its upward end for discharging the potatoes onto the screen arrangement 40. The front wall 46 is also provided with a second opening 48 at its lower end, as shown particularly in FIGURE 1, through which the conveyor 16 travels and from which some water from the wash tank 14 is discharged into the sump 30, as will appear more clearly hereinafter.

There is connected to the inner side of the front wall 46 a flap valve 50 which is pivotally connected, by means of a hinge 52 to the front wall 46 of the wash tank 14. The flap valve 50 limits the discharge of water from the wash tank through the opening 48 and, at the same time, permits the conveyor 16 to enter and travel along the bottom of the wash tank 14. In operation, the rearward edge of the flap valve normally rides on the conveyor but rides up over cross-pieces 54 on the conveyor, as is particularly shown in FIGURE 6.

In order to reinforce the top of the wash tank 14, particularly when the potatoes are being dropped into the wash tank, there is provided a pair of transversely extending angle members 55 and 56 which are welded at the top of the wash tank. These members are located in the loading region of the apparatus.

Toward the rearward end of the wash tank there is disposed a nozzle 58 which extends transversely of the wash tank and which sprays water onto the conveyor rearwardly of the point of introduction of the potatoes. This nozzle is fed by means of a pipe 60 from a suitable pump or source of pressure water. The amount of water fed into the wash tank is controlled by means of the valve 62.

The wash tank is maintained in its inclined position by means of upwardly extending supporting arms 64 which are bolted to the rearward end of the wash tank 14 and which are also bolted to the tank 32 as is particularly shown in FIGURE 1. The supporting arms 64 may be adjustable to adjust the incline of the wash tank 14 but, as shown in the drawings, the support arms 64 are rigidly connected to their associated parts.

The wash tank 14 extends rearwardly of the rear wheels 22 of the apparatus of the invention so that the stones and debris are dropped from the apparatus directly onto the ground.

The conveyor 16 is a belt type conveyor which includes a belt 66 connected to and driven by chains 68. The chain 68 is actuated by means of driving sprockets 70 journalled on the rearward end of the wash tank 14 and passes over supporting sprockets 71 which are journalled on the vertically extending supporting bars 64 and which are disposed below the wash tank. The chains then pass over guide sprockets 72 located at the forward end of the wash tank, these sprockets 72 being journalled on the tank 32.

Extending transversely of the conveyor belt are the cross-pieces 54, previously referred to, which are attached to the belt 66 by means of an angle member 74, as is particularly shown in FIGURES 4 and 5. These cross-pieces are made of wood or other suitable material and function to move the stones and debris out of the wash tank 14 and drop them off at the rearward end of the apparatus of the invention.

Attached to the side of the wash tank 14 and extending longitudinally of the tank are a pair of boards 76 which over-ride the chains 68 of the conveyor 16. These boards 76 extend the full length of the wash tank 14 in the illustrated embodiment and function to prevent damage to the chains 68.

In order to limit the loss of water from the wash tank 14, the flap valve 50 is shaped to fit around the boards 76, as particularly shown in FIGURE 2, and triangular pieces 78 are provided on the boards 76. When the flap valve rides over the cross-pieces 54 of the conveyor, edges of the valve ride along the edges of the triangular piece, thereby limiting the loss of water from the wash tank 14 and damage to the potatoes.

The drive means 18 for the conveyor 16 is disposed on the wash tank on the rearward end thereof. The drive means 18 actuates the drive sprocket 70 to effect movement of the conveyor 16. The drive sprocket is actuated by a chain designated 80 in the drawings. This chain is driven by a motor 82 which actuates the chain through a gear reducing arrangement 84. This arrangement comprises a pulley 86 which is mounted on a shaft 88 and drives a sprocket 90. The sprocket 90 actuates a larger sprocket 92 by means of a drive chain 94. The larger sprocket 92 is also mounted on a shaft 95 which rotates another sprocket 96 over which is trained the drive chain 80. The drive means 18 is mounted on a platform 98 which is connected to the wash tank 14 as is particularly shown in FIGURE 1.

In operation of the apparatus of the invention, the apparatus may be towed to a desired location by pulling the tongue 38. When the apparatus is desirably located, the pipe 60 is connected to a source of pressure water for discharge through the nozzle 58 into the wash tank 14. The wash tank 14 is filled until it overflows the forward opening in the wash tank at the screen arrangement 40. The harvested potatoes are dropped into the apparatus in the region of the reinforcing angle members 55 and 56. The flow of water out of the tank 14 causes the potatoes to float from the rear end of the wash tank 54 onto the screen arrangement 40 in a washed condition. The stones and debris drop to the bottom of the wash tank and are carried rearward and upward in the wash tank by means of the cross-pieces 54 mounted on the conveyor 16.

The potatoes roll down the screen arrangement 40, and water drains into the sump 30 and is discharged through the opening 34.

The stones are carried rearwardly and dropped from the apparatus of the invention onto the ground and can be distributed in the field or otherwise as desired.

In order to effect satisfactory operation, sufficient water must be introduced into the apparatus of the invention in proportion to the rate at which the potatoes are fed to the apparatus. In a field operation, water is fed to the tank at the rate of 500 gallons per minute. The potatoes are fed into the apparatus at the rate of 700 bushels per hour. The conveyor 16 is operated at a speed of 48 feet per minute. The wash tank is 1¾ feet in width and 12 feet in length, it being inclined at a level of about ten degrees.

In actual field operation, the apparatus of the invention is highly successful in removing stones and debris from potatoes but, additionally, effects a good washing of the potatoes to thereby facilitate processing of the potatoes in processing plants.

The particular features of the invention which are believed to be new are set forth in the following claims.

I claim:

1. Apparatus for separating stones and debris from potatoes comprising, in combination, an inclined wash tank capable of containing a pool of water and a supply of potatoes and having an aperture at its lower end, nozzle means associated with said wash tank for causing a flow of water along the surface of the pool toward the lower end of said tank of sufficient velocity to move the potatoes toward said lower end while sustaining the potatoes in floating relationship therein, collecting means associated with said lower end for receiving the potatoes, valve means on said tank at the lower end thereof adapted to close off said aperture; and divert submerged potatoes upwardly the top of said wash tank, said valve means inclining upwardly from the bottom of said tank toward said lower end, conveying means in said tank and adjacent the bottom of said tank, and means connected to said conveying means for moving said conveying means countercurrent to said flowing water thereby moving the stones and debris upwardly along the bottom of said wash tank.

2. An apparatus for separating stones and debris from potatoes comprising, in combination, an inclined wash tank for containing a pool of water and a supply of potatoes and having an aperture at its lower end, nozzle means associated with said wash tank for causing a flow of water along the surface of the pool toward the lower end of said tank of sufficient velocity to move the potatoes toward said lower end while sustaining the potatoes in floating relationship therein, collecting and draining means associated with said lower end for receiving the potatoes, a sump below said collecting and draining means to receive the water flowing from said wash tank, an inclined valve means attached to the lower end of said tank and adapted to close off said aperture and divert submerged potatoes upwardly toward the top of said wash tank, said valve means extending upwardly from the conveyor means and toward the lower end of said tank, conveying means in said tank adjacent the bottom of said tank, and means for moving said conveying means countercurrent to said flowing water to move the stones and debris upwardly along the bottom of said wash tank.

References Cited in the file of this patent

UNITED STATES PATENTS

| | | |
|---|---|---|
| 1,044,844 | Argall | Nov. 19, 1912 |
| 1,885,988 | Chapman | Nov. 1, 1932 |
| 2,025,841 | Young | Dec. 31, 1935 |
| 2,082,467 | Prins | June 1, 1937 |
| 2,489,161 | Scholes | Nov. 22, 1949 |
| 2,718,966 | Hardinge | Sept. 27, 1955 |
| 2,946,438 | Belugou | July 26, 1960 |

UNITED STATES PATENT OFFICE
CERTIFICATE OF CORRECTION

Patent No. 2,990,064                          June 27, 1961

Otto Schoeneck

It is hereby certified that error appears in the above numbered patent requiring correction and that the said Letters Patent should read as corrected below.

Column 4, line 63, after "upwardly" insert -- toward --.

Signed and sealed this 21st day of November 1961.

(SEAL)
Attest:

ERNEST W. SWIDER                                DAVID L. LADD
Attesting Officer                                      Commissioner of Patents

USCOMM-DC